(12) United States Patent
Barger et al.

(10) Patent No.: US 6,632,357 B1
(45) Date of Patent: Oct. 14, 2003

(54) REVERSE OSMOSIS ("RO") MEMBRANE SYSTEM INCORPORATING FUNCTION OF FLOW CHANNEL SPACER

(75) Inventors: Marilyn Barger, Temple Terrace, FL (US); Drew Hoff, Tampa, FL (US); Robert P. Carnahan, Temple Terrace, FL (US); Richard A. Gilbert, Tampa, FL (US)

(73) Assignee: University of South Florida, Tampa, FL (US)

( * ) Notice: Subject to any disclaimer, the term of this patent is extended or adjusted under 35 U.S.C. 154(b) by 69 days.

(21) Appl. No.: 09/709,016

(22) Filed: Nov. 8, 2000

Related U.S. Application Data

(60) Provisional application No. 60/166,187, filed on Nov. 18, 1999.

(51) Int. Cl.[7] .......................... B01D 63/10; B01D 63/08
(52) U.S. Cl. .......................... 210/321.83; 210/321.74; 210/321.84; 210/493.4; 210/497.1
(58) Field of Search ....................... 210/321.74, 321.83, 210/493.4, 497.1, 321.84

(56) References Cited

U.S. PATENT DOCUMENTS

| | | | |
|---|---|---|---|
| 3,962,096 A | * 6/1976 | Ishii et al. .................. | 210/494 |
| 4,059,530 A | * 11/1977 | Luppi ......................... | 210/494 |
| 4,476,022 A | * 10/1984 | Doll ......................... | 210/433.2 |
| 4,756,835 A | 7/1988 | Wilson ....................... | 210/651 |
| 4,834,881 A | * 5/1989 | Sawada et al. ........ | 210/321.74 |
| 4,855,058 A | * 8/1989 | Holland et al. ........ | 210/321.83 |
| 4,861,487 A | * 8/1989 | Fulk, Jr. ................ | 210/321.83 |
| 4,902,417 A | 2/1990 | Lien ..................... | 210/321.74 |
| 4,944,877 A | * 7/1990 | Maples .................. | 210/321.74 |
| 5,094,749 A | * 3/1992 | Seita et al. ............ | 210/321.75 |
| 5,114,582 A | * 5/1992 | Sandstrom et al. .... | 210/321.74 |
| 5,147,541 A | * 9/1992 | McDermott, Jr. et al. ..................... | 210/321.74 |
| 5,192,437 A | * 3/1993 | Chang et al. .......... | 210/321.83 |
| 5,460,720 A | 10/1995 | Schneider ............. | 210/321.86 |

* cited by examiner

*Primary Examiner*—John Kim
(74) *Attorney, Agent, or Firm*—Howard & Howard

(57) ABSTRACT

A permeable membrane system (10) for the separation of fluid components includes a laminated composition (12) having two sheets (14 and 16) formed from a polymer and positioned adjacent one another to form a fluid passage (18) therebetween. The outside surfaces (20 and 22) of the sheets (14 and 16) are permeable to allow fluid flow from the outside surface (20 and 22) to the fluid passage (18). The outside surface (20 and 22) of the laminated composition (12) includes a plurality of embossed islands spaced from one another to define feed pathways (26) around and between the embossed islands.

7 Claims, 3 Drawing Sheets

FIG - 1
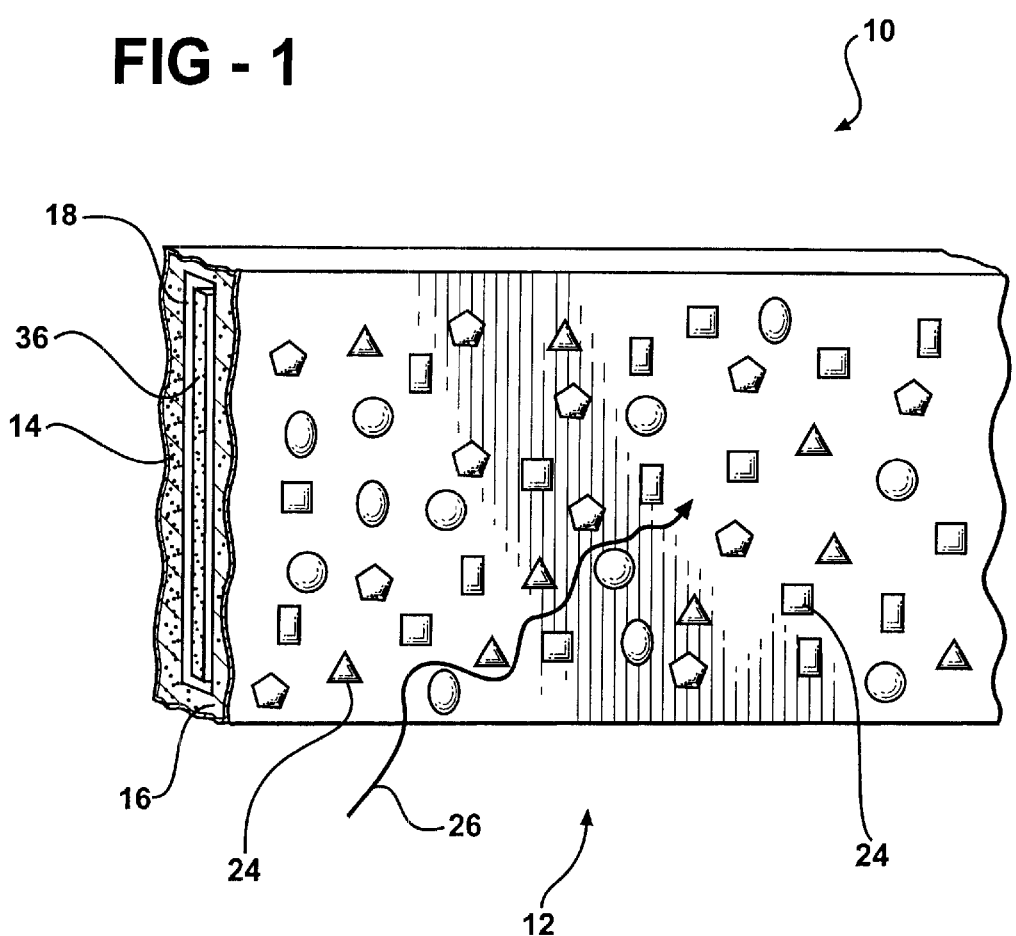
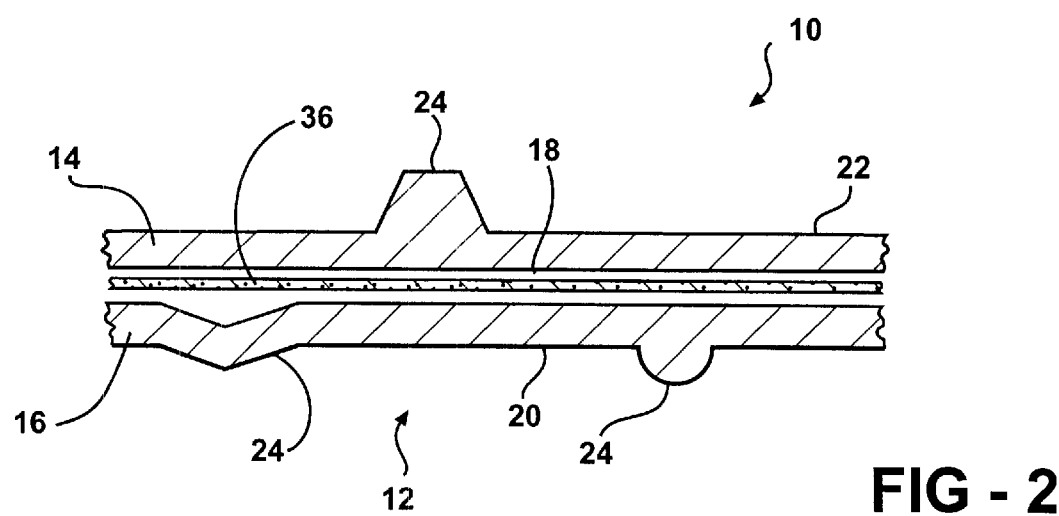
FIG - 2

REVERSE OSMOSIS ("RO") MEMBRANE SYSTEM INCORPORATING FUNCTION OF FLOW CHANNEL SPACER

RELATED U.S. APPLICATIONS

This application claims priority to provisional application Ser. No. 60/166,187, filed on Nov. 18, 1999.

BACKGROUND OF THE INVENTION

1. Field of the Invention

The subject invention relates to a permeable membrane system utilized for the separation of fluid components.

2. Description of the Prior Art

Various permeable membrane systems are well known in the prior art that include a laminated composition having two sheets positioned adjacent one another to form a fluid passage therebetween and allow fluid flow from the outside surfaces to a fluid passage. An example of such a membrane system is disclosed in the U.S. Pat. No. 4,756,835 to Wilson.

The Wilson patent discloses a permeable membrane system composed of two sheets positioned adjacent one another to form a fluid passage therebetween and allow fluid to flow from the outside surfaces of the membrane to the fluid passage. The permeable membrane system is further defined by adding evenly spaced grooves to at least one outside surface of the system.

Although the prior art is useful in separation and filtration processes, there remains an opportunity for a permeable membrane system that provides a feed channel surface that will reduce fouling of the membranes and maintain adequate surface area for the mass transfer of fluid.

SUMMARY OF THE INVENTION AND ADVANTAGES

The invention provides a permeable membrane system for the separation of fluid components, comprising a laminated composition with two permeable sheets positioned adjacent one another to form a fluid passage therebetween. The laminated composition promotes fluid flow from the outside surface to the fluid passage and includes projections on at least one of the outside surfaces for spacing a plurality of laminated compositions layered together. The permeable membrane system is characterized by the projections being defined by numerous embossed islands spaced from one another to define feed pathways around and between the embossed islands.

The use of this altered membrane in a spiral wound or other cross flow membrane separation system will provide more surface area for the mass transfer of fluid through the membrane as compared to the surface area provided by a membrane system that requires a spacer. Also, the system will create increased turbulence in comparison to the prior art that utilize a separate spacer to maintain the feed pathways. This results in less susceptibility to system fouling, greater separation efficiency and longer use.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a laminated composition laid out in accordance with the subject invention;

FIG. 2 is an enlarged cross section of the laminated composition;

DETAILED DESCRIPTION OF THE PREFERRED EMBODIMENT

Figure 3:
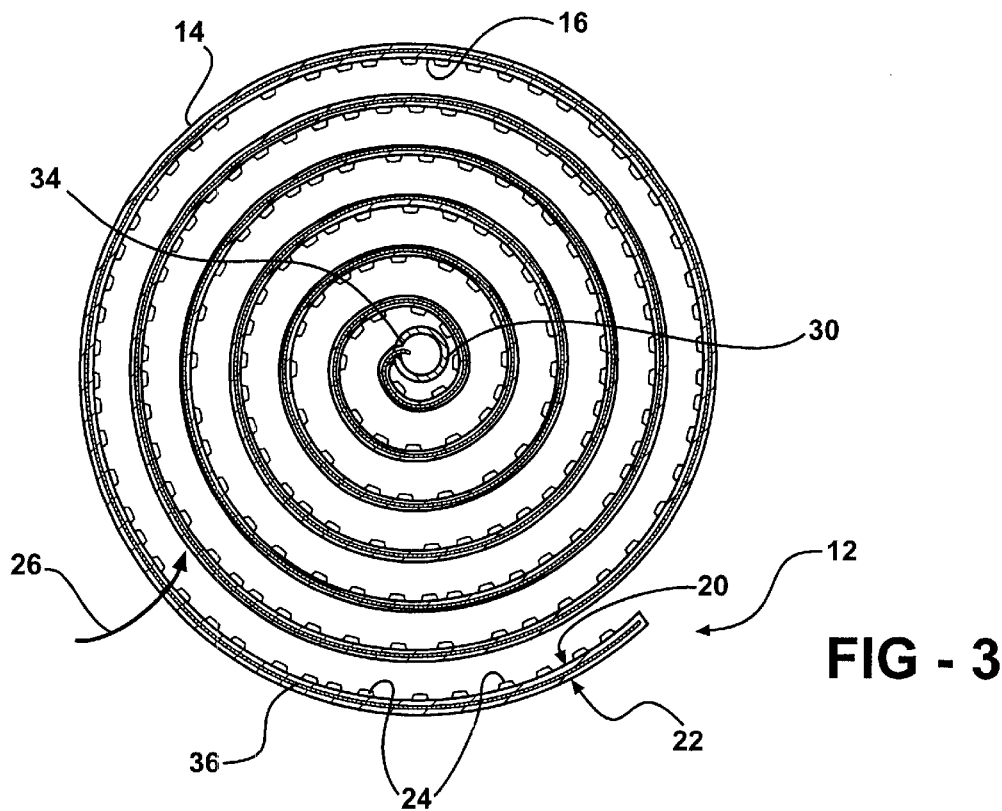
FIG. 3 is a cross-sectional view illustrating one configuration of the subject invention.

Referring to the Figures, wherein like numerals indicate like or corresponding parts throughout the several views, a permeable membrane system for the separation of fluid components is generally shown at 10 in FIGS. 1 and 2. The permeable membrane system includes a laminated composition 12 having two sheets 14, 16 formed from a polymer and positioned adjacent one another to form a fluid passage 18 therebetween. The outside surfaces 20, 22 of the sheets are permeable to allow fluid flow from the outside surface 20, 22 to the fluid passage 18. Projections 24 on at least one of the outside surfaces 20, 22 of the laminated composition 12 are used for spacing a plurality of laminated compositions 12 layered together. The projections 24 may also be placed on both of the outside surfaces 20, 22 of the laminated compositions 12.

The system is characterized by the projections 24 being defined as a plurality of embossed islands spaced from one another to define feed pathways 26 around and between the embossed islands. In other words, the projections 24 are separated from one another in all radial directions so that each projection is surrounded by a feed pathway 26.

To further define the permeable membrane system 10 the plurality of embossed islands can be integrally formed, printed, glued or implanted on the outside surface 20, 22. In addition the plurality of embossed islands can assume pyramidal, hemispherical, cubical, or conical shapes or a combination thereof.

Each laminated composition 12 has an open edge 28 revealing the fluid passage 18 and the open edge 28 is longitudinally attached to a product carrier such as a tube 30 forming a permeate flow pathway 32 from the fluid passage 18 to the product tube 30. A seal 34 is used to create a fluid resistant bond between the product tube 30 and the laminated composition 12.

The fluid passage 18 may include a wick 36 for assisting in the movement of fluid from the fluid passage 18 to the product tube 30.

Figure 4:
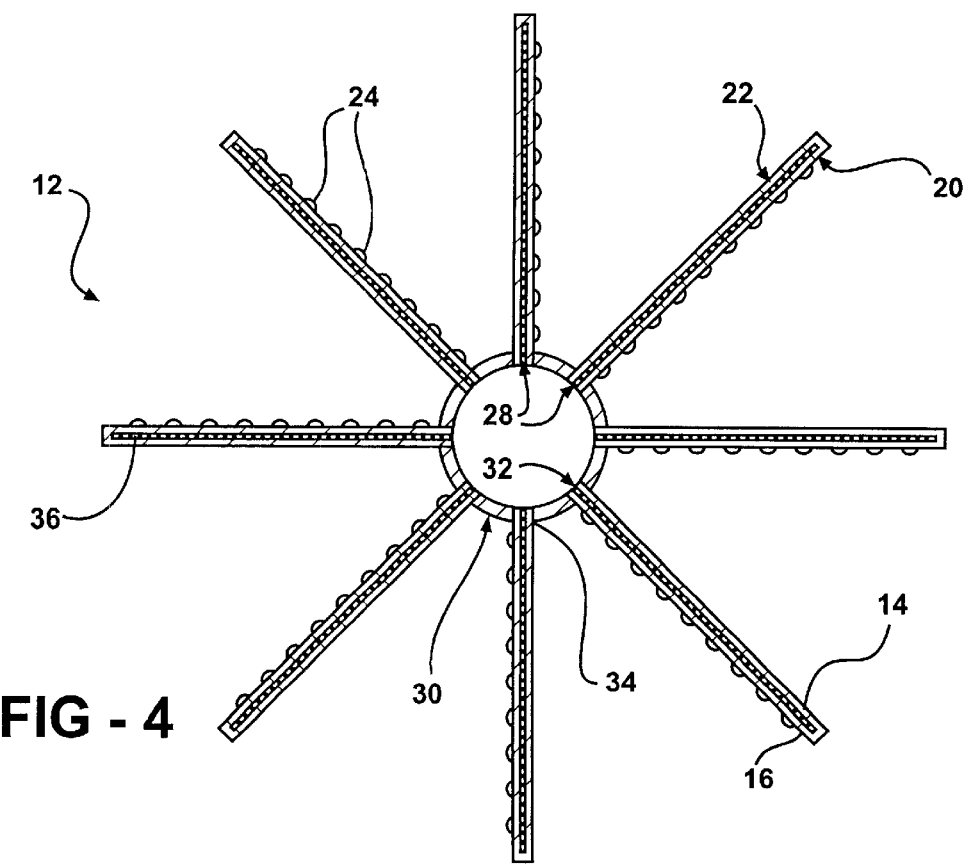
FIG. 4 is a dross section illustrating another configuration of the subject invention.
Figure 5:
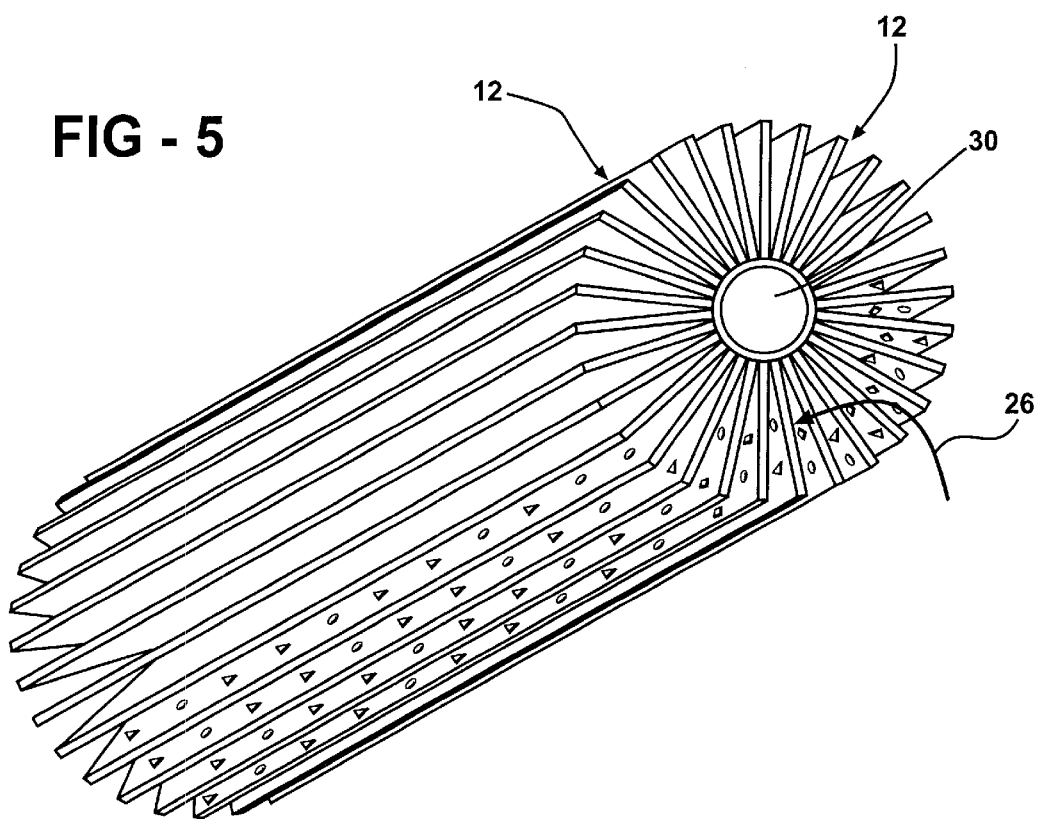
FIG. 5 is a perspective view depicting a plurality of laminated compositions uniformly positioned around a product tube and extending radially from the product tube such that each laminated composition is in contact with two adjacent laminated compositions.
Figure 6:
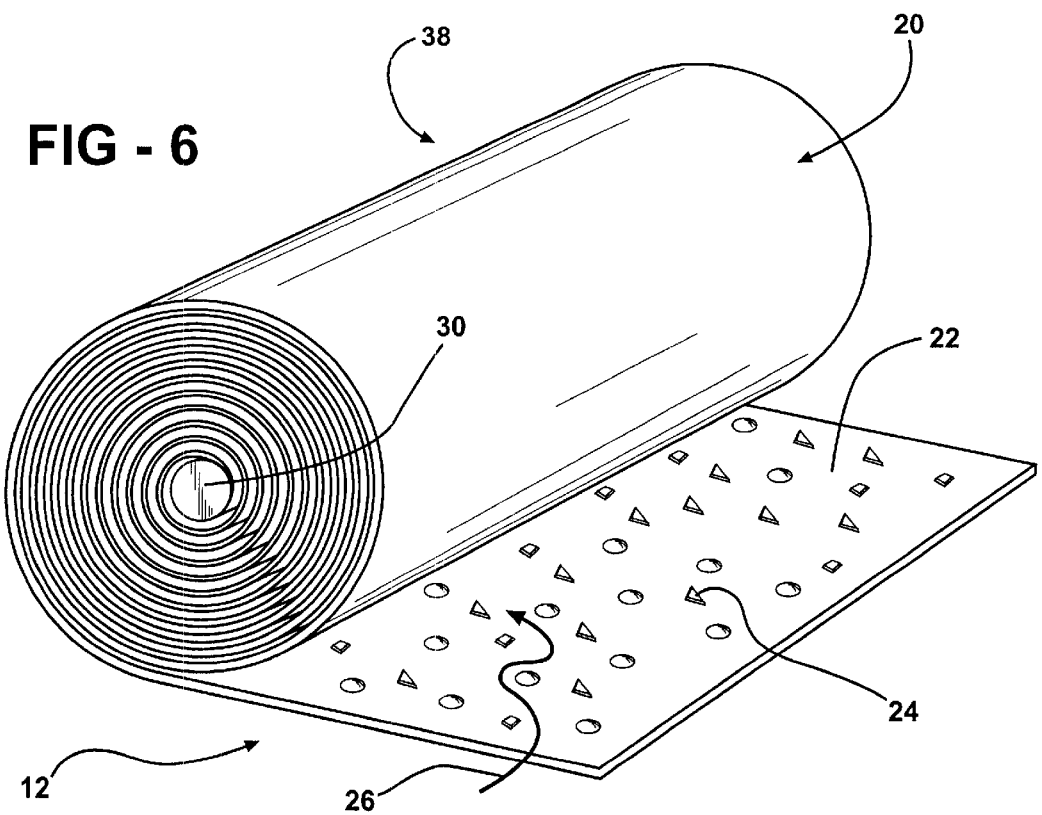
FIG. 6 is a perspective view depicting a laminated composition tightly rolled around a product tube to form a continuous roll.

To serve the intent of the present invention, which is the separation of fluid components, the laminated compositions 12 can be configured for use in membrane separation processes such as reverse osmosis, ultrafiltration, nanofiltration and microfiltration. Referring to FIG. 5, a plurality of laminated compositions 12 can be uniformly positioned around the product tube 30 and extend radially from the product tube 30 such that the embossed islands from each laminated composition 12 are in contact with at least one adjacent laminated composition 12 forming a feed pathway 26. FIG. 4 is a cross section of FIG. 5 with exaggerated spacing of laminated compositions 12. Referring to FIG. 6, one laminated composition 12 can also be orientated such that the laminated composition 12 is tightly rolled around the product tube 30 to form a continuous roll 38 such that the embossed islands from the laminated composition 12 form feed pathways 26. FIG. 3 is a cross-sectional view of FIG. 6 in which the laminated composition 12 is loosely rolled around the product tube 30 for improved visual representation.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A permeable membrane system (10) for the separation of fluid components, said system comprising;

a product tube (30), a plurality of laminated compositions (12), each having two sheets (14 and 16) positioned adjacent one another defining a fluid passage (18) therebetween and each having an open edge revealing said fluid passage (18) wherein said open edge is attached to said product tube (30) to form a permeate flow pathway (32) from said fluid passage (18) to said product tube (30), said sheets (14 and 16) having outside surfaces (20 and 22) and being permeable to allow fluid flow from said outside surfaces (20 and 22) to said fluid passage (18), projections (24) on at least one of said outside surfaces (20 and 22) for spacing said plurality of laminated compositions (12) layered together, said projections (24) being defined by a plurality of embossed islands spaced from one another to define feed pathways (26) around and between said embossed islands, a seal (34) between said product tube (30) and said plurality of laminated compositions (12) for creating a fluid resistant bond, and a wick (36) positioned in said fluid passage (18) for assisting in the movement of fluid from said fluid passage (18) to said product tube (30).

2. A system as set forth in claim 1 wherein said plurality of laminated compositions (12) are uniformly positioned around said product tube (30) and extend radially from said product tube (30).

3. A system as set forth in claim 2 wherein said embossed islands from each laminated composition (12) are in contact with at least one adjacent laminated composition (12) forming said feed pathways (26).

4. A permeable membrane system (10) for the separation of fluid components, said system comprising;

a product tube (30), a laminated composition (12) having two sheets (14 and 16) positioned adjacent one another defining a fluid passage (18) therebetween and having an open edge revealing said fluid passage (18) wherein said open edge is attached to said product tube (30) to form a permeate flow pathway (32) from said fluid passage (18) to said product tube (30), said sheets (14 and 16) having outside surfaces (20 and 22) and being permeable to allow fluid flow from said outside surfaces (20 and 22) to said fluid passage (18), projections (24) on at least one of said outside surfaces (20 and 22) for spacing said laminated composition (12) when rolled, said projections (24) being defined by a plurality of embossed islands spaced from one another to define feed pathways (26) around and between said embossed islands, a seal (34) between said product tube (30) and said laminated composition (12) for creating a fluid resistant bond, and a wick (36) positioned in said fluid passage (18) for assisting in the movement of fluid from said fluid passage (18) to said product tube (30).

5. A system as set forth in claim 4 wherein said laminated composition (12) is tightly rolled around said product tube (30) to form a continuous roll (38) such that said embossed islands form said feed pathways (26).

6. A permeable membrane system (10) for the separation of fluid components, said system comprising;

a laminated composition (12) having two sheets (14 and 16) positioned adjacent one another defining a fluid passage (18) therebetween, said sheets (14 and 16) having outside surfaces (20 and 22) and being permeable to allow fluid flow from at least one of said outside surfaces (20 and 22) to said fluid passage (18), projections (24) on at least one of said outside surfaces (20 and 22) defined by a plurality of embossed islands spaced from one another to define feed pathways (26) around and between said embossed islands, and a wick (36) positioned within said fluid passage for assisting in the movement of fluid through said fluid passage (18).

7. A system as set forth in claim 6 further including a product carrier (30) wherein said laminated composition (12) is attached to said product carrier (30) such that said wick (36) assists in moving fluid from said fluid passage (18) toward said product carrier (30).

* * * * *